United States Patent [19]
Gupta

[11] Patent Number: 6,122,361
[45] Date of Patent: Sep. 19, 2000

[54] AUTOMATED DIRECTORY ASSISTANCE SYSTEM UTILIZING PRIORI ADVISOR FOR PREDICTING THE MOST LIKELY REQUESTED LOCALITY

[75] Inventor: Vishwa Gupta, Brossard, Canada

[73] Assignee: Nortel Networks Corporation, Montreal, Canada

[21] Appl. No.: 08/928,769

[22] Filed: Sep. 12, 1997

[51] Int. Cl.[7] .................................................. H04M 7/00
[52] U.S. Cl. .................. 379/223; 379/88.01; 379/88.03; 704/251
[58] Field of Search .............................. 379/88.01, 88.02, 379/88.03, 88.04, 213, 223; 704/234, 255, 256, 257, 251, 231, 246, 250, 252

[56] References Cited

U.S. PATENT DOCUMENTS

| | | | |
|---|---|---|---|
| 4,164,025 | 8/1979 | Dubnowski et al. | 364/900 |
| 4,751,736 | 6/1988 | Gupta et al. | 381/31 |
| 4,751,737 | 6/1988 | Gerson et al. | 381/43 |
| 4,797,910 | 1/1989 | Daudelin | 379/67 |
| 4,956,865 | 9/1990 | Lennig et al. | 381/43 |
| 4,959,855 | 9/1990 | Daudelin | 379/213 |
| 4,979,206 | 12/1990 | Padden et al. | 379/67 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,226,044 | 7/1993 | Gupta et al. | 370/81 |
| 5,274,695 | 12/1993 | Green | 379/88 |

(List continued on next page.)

FOREIGN PATENT DOCUMENTS 2 091 658  9/1994  Canada.

OTHER PUBLICATIONS

Gupta et al., "Fast Search Strategy in a Large Vocabulary Word Recognizer," J. Acoust. Soc. Am., 84(6), pp. 2007–2017 (Dec. 1988).
Lennig, "Putting Speech Recognition To Work In The Telephone Network", *Computer*, pp. 35–41, (1990).
Rabiner et al., "An Introduction To Hidden Markov Models", *IEEE ASSP Magazine*, pp. 4–16, (1986).
Gorin et al., "Adaptive Acquisition Of Language", *Computer Speech And Language*, vol. 5:101–132, (1991).
Bakis et al., "Dynamic Modification Of The Vocabulary Of A Speech Recognition Machine", *IBM Technical Disclosure Bulletin*, vol. 27(7A):3945–3946, (1984).
Lennig et al., "Unleashing The Potential Of Human–to–Machine Communication", *Flexible Vocabulary Recognition*, pp. 23–31.
Gao et al., "Dynamic Adaptation Of Hidden Markov Model For Robust Speech Recognition", pp. 1336–1339, (1989).

*Primary Examiner*—Krista Zele
*Assistant Examiner*—Benny Q. Tieu

[57] ABSTRACT

The invention relates to an automated directory assistance system that utilizes a priori advisor for predicting the most likely requested locality. The automated directory assistance system includes a speech recognition dictionary containing a plurality of orthographies, each orthography corresponding to a locality name in which a subscriber whose telephone number is sought by the user of the automated directory assistance system may be residing. Upon reception of the spoken utterance, the system performs a first pass search scores on the basis of acoustics characteristics of the orthographies in the speech recognition dictionary, each orthography having a certain likelihood of being a match to the spoken utterances. The orthographies are then weighed on the basis of information indicative of the geographical location of the user. A final re-scoring operation may then be performed on the top N candidates in the weighed list. This system enables to improve recognition accuracy by combining the acoustical match search with a probabilistic bias derived from statistical information on calling patterns in the population.

31 Claims, 4 Drawing Sheets

U.S. PATENT DOCUMENTS

| | | | |
|---|---|---|---|
| 5,307,444 | 4/1994 | Tsuboka | 395/22 |
| 5,390,278 | 2/1995 | Gupta et al. | 395/2.52 |
| 5,488,652 | 1/1996 | Bielby et al. | 379/88 |
| 5,515,475 | 5/1996 | Gupta et al. | 395/2.51 |
| 5,553,119 | 9/1996 | McAllister et al. | 379/88.01 |
| 5,638,425 | 6/1997 | Meador, III et al. | 379/88.01 |
| 5,644,680 | 7/1997 | Bielby et al. | 704/240 |
| 5,799,276 | 8/1998 | Komissarchick et al. | 704/251 |
| 5,839,107 | 11/1998 | Gupta et al. | 707/102 |
| 5,845,245 | 12/1998 | Gupta et al. | 704/231 |
| 5,905,773 | 5/1999 | Wong | 379/88.03 |
| 5,987,414 | 11/1999 | Sabourin et al. | 704/270 |
| 5,995,929 | 11/1999 | Gupta | 704/251 |

AUTOMATED DIRECTORY ASSISTANCE SYSTEM UTILIZING PRIORI ADVISOR FOR PREDICTING THE MOST LIKELY REQUESTED LOCALITY

FIELD OF THE INVENTION

This invention relates to a method and an apparatus for automatically performing desired actions in response to spoken requests. It is particularly applicable to a method and an apparatus for automatically providing desired information in response to spoken requests, as may be used to partially or fully automated telephone directory assistance functions.

BACKGROUND OF THE INVENTION

In addition to providing printed telephone directories telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable effort to the development of systems that reduce the labor costs associated with providing directory assistance services.

In a typical directory assistance system the caller is first prompted to provide locality information, in other words to specify in what area resides the business or individual whose telephone number he seeks. If valid speech is detected, the speech recognition layer is invoked in an attempt to recognize the unknown utterance. On a first pass search, a fast match algorithm is used to select the top N orthography groups from a speech recognition dictionary. In a second pass the individual orthographies from the selected groups are re-scored using a more precise likelihood computation. The top orthography in each of the top two groups is then processed by a rejection algorithm that evaluates if they are sufficiently distinctive from one another so the top choice candidate can be considered to be a valid recognition.

The signal processing operation described above is based solely on an acoustic analysis of the spoken utterance. This sometimes may not enable the system to make a resolution. Indeed, the wide variety of accents that exist in the population and, more particularly, the manner with which individuals formulate requests results in situations in which correct word recognition cannot be made solely on the basis of acoustic match. Thus, there is a need in the industry to provide a speech recognition system that utilizes additional elements of information that when combined with the acoustical analysis of the spoken utterance enables to improve the speech recognition accuracy.

OBJECTS AND STATEMENT OF THE INVENTION

A principal object of the invention is to provide a speech recognition system, particularly well suited for use in an automated directly assistance system with an improved speech recognition accuracy.

Another object of the invention is to provide an improved method for performing speech recognition, particularly well suited in the context of locality recognition.

Another object of this invention is to provide a computer readable storage medium containing a program element that directs a computer to perform speech recognition, the program element being designed such as to improve the speech recognition.

As embodied and broadly described herein the invention provides an automated directory assistance system comprising:

a) a speech recognition dictionary including a plurality of orthographies potentially recognizable on a basis of a spoken utterance by a user of said automated directory assistance system, each orthography being indicative of a locality in which an entity whose telephone number potentially sought by the user may reside;

b) means for extracting from said speech recognition dictionary on the basis of the spoken utterance by the user a list including a plurality of orthographies, each of said plurality of orthographies being a candidate having a certain probability to correspond to the spoken utterance;

c) means for weighing candidates in said list on a basis of information indicative of a geographical location of the user of said automated directory assistance system.

For the purpose of this specification the expressions "orthography" is a data element that can be mapped onto a spoken utterance that can form a single word or a combination of words.

For the purpose of this specification the expression "dictionary" designates a data structure containing orthographies that can be mapped onto a spoken utterance on the basis of acoustic characteristics and, optionally, a-priori probabilities or another rule, such as a linguistic or grammar model.

In a most preferred embodiment of this invention, the automated directory assistance system is integrated into a telephone network that enables users to formulate requests by using subscriber terminal equipment such as mobile or fixed telephone sets. Once the automated directory assistance system receives a request from the user, it will first issue a prompt over the telephone network requesting the user to specify the locality in which the telephone number he seeks is located. If valid speech is detected in response to this prompt, a speech recognition layer is invoked that selects from a speech recognition dictionary an orthography that is most likely to match the spoken utterance. The speech recognition process is essentially a three step operation. The first step, usually referred to as "first pass search", consists of scoring all the orthographies in the speech recognition dictionary by performing a rough estimation on the basis of acoustical match alone.

Following this, during the second step, a weighing procedure is performed that will change or alter the probability of one or more candidates in the list on the basis of information other than just acoustical match between the spoken utterance and the orthographies. In a specific example, the probability of each candidate in the output list is conditioned on the basis of geographical information relating to the location from which the user has formulated the request. This information can be valuable in correctly recognizing the locality name since requests for automated directory assistance are likely to follow predetermined call patterns. By utilizing screened tokens (observing actual call records) and actual unscreened call records, statistical information can be gathered to model the calling patterns. This statistical information can then be used in conjunction with acoustical matching between the spoken utterance and orthographies in the speech recognition dictionary to improve the accuracy of the speech recognition operation.

The calling number can be used to determine the geographical location of the user. In a very specific example, the first six digits of the calling number of a ten digit telephone number are used (the first three digits represent the are code). This information, usually referred to as "NPA-NXX", can be correlated to various orthographies from the speech recognition dictionary, that in turn are associated with respective probability values. In one specific embodiment, the speech recognition system is provided with a plurality of data structures, herein referred to as histograms, each histogram being associated to a certain calling NPA-NXX combination, each data structure containing an index or pointer to an orthography in the speech recognition dictionary, each index or pointer in the data structure being associated with a certain probability value that is established on the basis of observed call patterns. The number of data structures available depends on the number of NPA-NXX combinations available in the network. If the number of those combinations is too high then only the combinations that occur most often can be used. If an NPA-NXX combination is encountered that is not programmed in the system, a default behavior can be designed to handle those situations. This will become apparent further on in the description.

Once the orthographies in the dictionary have been scored as a result of the first pass search, the NPA-NXX combination associated with the calling number/called number is obtained and the corresponding histogram is retrieved. This histogram may be in the form of a table that contains two columns, each record thus including two separate fields namely a locality identifier which may be the name of the locality, an index or a pointer (corresponding to an orthography from the speech recognition dictionary) and an associated probability value. For each orthography in the dictionary a compound probability estimate is computer using the probability stored in this histogram. This computation constitutes an example of the weighing operation referred to earlier in the broad definition of the invention. In general, the weighing operation can be defined as a procedure that has the effect of impressing a certain bias over one or more orthographies in the speech recognition dictionary, the bias being dependent upon information indicative of a geographical location of the site from which the user has input the spoken utterance and the called directory assistance number. The result of this bias is to give higher chances to one orthography over another one during the process of selecting the orthography that will be output as being the best possible match to the spoken utterance.

At this point, one possibility is to order the list of orthographies based on decreasing compound probability values and select the choice, in other words, the candidate, possessing the highest compound probability value as being the orthography that presents the best match for the spoken utterance. A more refined approach, which would constitute the third processing step mentioned earlier, is to select from the ordered list of orthographies the top N scoring orthographies and perform a detailed acoustic match analysis for every orthography in the sub-group in order to perform a final ranking. In this approach, the weighing operation based on probabilities in the histogram influences the selection of candidates to be submitted to the re-scoring stage. The re-scoring operation uses more precise computations and selects the most likely candidate. During this computation the weighing operation based on probability scores in the histograms has no effect on which candidate will be output as top choice since the selection performed at the re-scoring stage uses acoustic match criteria only. Optionally, it may be desirable to include the a priori probability scores in the re-scoring stage in order to weight the orthographies that occur frequently in a preferential fashion.

As embodied and broadly described herein the invention also provides a method for performing speech recognition in an automated directory assistance system, said method comprising the steps of:

a) providing a speech recognition dictionary including a plurality of orthographies potentially recognizable on a basis of a spoken utterance by a user of said automated directory assistance system, each orthography being indicative of a locality in which an entity whose telephone number potentially sought by the user may reside;

b) receiving a spoken utterance by the user of the automated directory assistance system;

d) searching said dictionary to derive a list of orthographies, each orthography in said list being a candidate having a certain probability to be a match to the spoken utterance;

c) assigning to at least one of the candidates in said list a probability value established on a basis of information indicative of a geographical location of the user of said automated directory assistance system.

As embodied and broadly described herein the invention further provides a method for performing speech recognition in an automated directory assistance system, said method comprising the steps of:

a) providing a speech recognition dictionary including a plurality of orthographies potentially recognizable on a basis of a spoken utterance by a user of said automated directory assistance system, each orthography being indicative of a locality in which an entity whose telephone number potentially sought by the user may reside;

b) receiving a spoken utterance by the user of the automated directory assistance system;

c) searching said dictioanry to derive a list of orthographies, each orthography in said being a candidate having a certain probability to be a match to the spoken utterance;

d) obtaining an identifier indicative of a geographical location of a terminal at which the user has input the spoken utterance;

e) utilizing said identifier to rank the candidates derived at step c in terms of likelihood of potential match with the spoken utterance.

As embodied and broadly described herein the invention further provides a machine readable storage medium containing a program element for instructing a computer for selecting at least one orthography from a speech recognition dictionary as being a likely match to a given spoken utterance, said computer including:

a) first memory means containing said speech recognition dictionary;

b) a processor in operative relationship with said first memory means;

c) said program element providing means for:

i) directing said processor to select from said speech recognition dictioanary a plurality of orthographies, said plurality of orthographies, said plurality of orthographies forming a list of candidates, each candidate having a certain probability to correspond to the spoken utterance;

ii) directing said processor to weigh candidates in said list on a basis of an input indicative of a geographical location of the user of said automated directory assistance system.

In a somewhat different aspect of this invention the scored orthographies obtained as a result of the first pass search can be weighed on the basis of information related to the call destination rather than the call origin, as described earlier in connection with a specific example. Typically, automated directory assistance systems can be accessed by dialing one of a series of possible telephone numbers assigned by the telephone companies to this function. Each telephone number is assigned a specific region in a large geographical area such as a large city, province or a country. Thus, a user desirous to obtain the telephone number in a locality close to his residence dials one specific telephone number. A typical telephone number that is used for this function in the North American continent is 411. On the other hand, if the user desires to obtain directory assistance for a locality situated far from his residence, a different telephone number is used. For example, in the province of Quebec, the telephone number 555-1212 can be used, preceded by the appropriate NPA. For the province of Quebec, three NPA's are used, namely 514, 418 and 819.

The NPA of the telephone number that the user is dialing when he is desirous of accessing automated directory assistance functions can provide some general indication of the geographical relationship or distance between the site at which the user is formulating the request and the locality that he seeks. Take as an example a situation where the user dials 514-555-1212. One can then assume that since this number has been dialed, a locality in the geographical area within the boundary in which the 514 NPA is effective is being sought. Thus, localities within that boundary can be given a higher probability, while localities outside of that boundary can be selectively penalized.

This approach allows enhancing the traditional acoustical match recognition procedure used to effect speech recognition. Objectively, the information relating to the NPA dialed by the user is less determinative than the information relating to the source of the call (NPA-NXX). Thus, it is preferable to utilize the calling number data when weighing the orthographies in the speech recognition dictionary. In some situations, however, the calling number data may not be available or statistical information for the particular NPA-NXX combination may not be provided in the system. For those instances, the probability data derived from the called number can be utilized.

As embodied and broadly described herein, the invention provides an automated directory assistance system comprising:
  a) a speech recognition dictionary including a plurality of orthographies potentially recognizable on a basis of a spoken utterance by a user of said automated directory assistance system, each orthography being indicative of a locality in which an entity whose telephone number potentially sought by the user may reside;
  b) means for detecting at least a portion of a telephone number dialed by the user to access a directory assistance call function;
  c) means responsive to said at least a portion of said telephone number dialed by the user and to the spoken utterance for determining a probability value for at least one of said orthographies, the probability value being indicative of a likelihood of match between said at least one of said orthographies and the spoken utterance.

As embodied and broadly described herein, the invention further provides a method for at least partially automating directory assistance in a telephone system, said method comprising the steps of:

providing a plurality of orthographies potentially recognizable on a basis of a spoken utterance by a user of said automated directory assistance system, each orthography being indicative of a locality in which an entity whose telephone number potentially sought by the user may reside;
  detecting a spoken utterance by a user;
  detecting at least a portion of a telephone number dialed by the user to access a directory assistance call function;
  selecting at least in part on the basis of the spoken utterance and at least in part on a basis of said at least a portion of a telephone number dialed by the user at least one of said orthographies as being a probable match to the spoken utterance.

DESCRIPTION OF PREFERRED EMBODIMENTS

Figure 1:
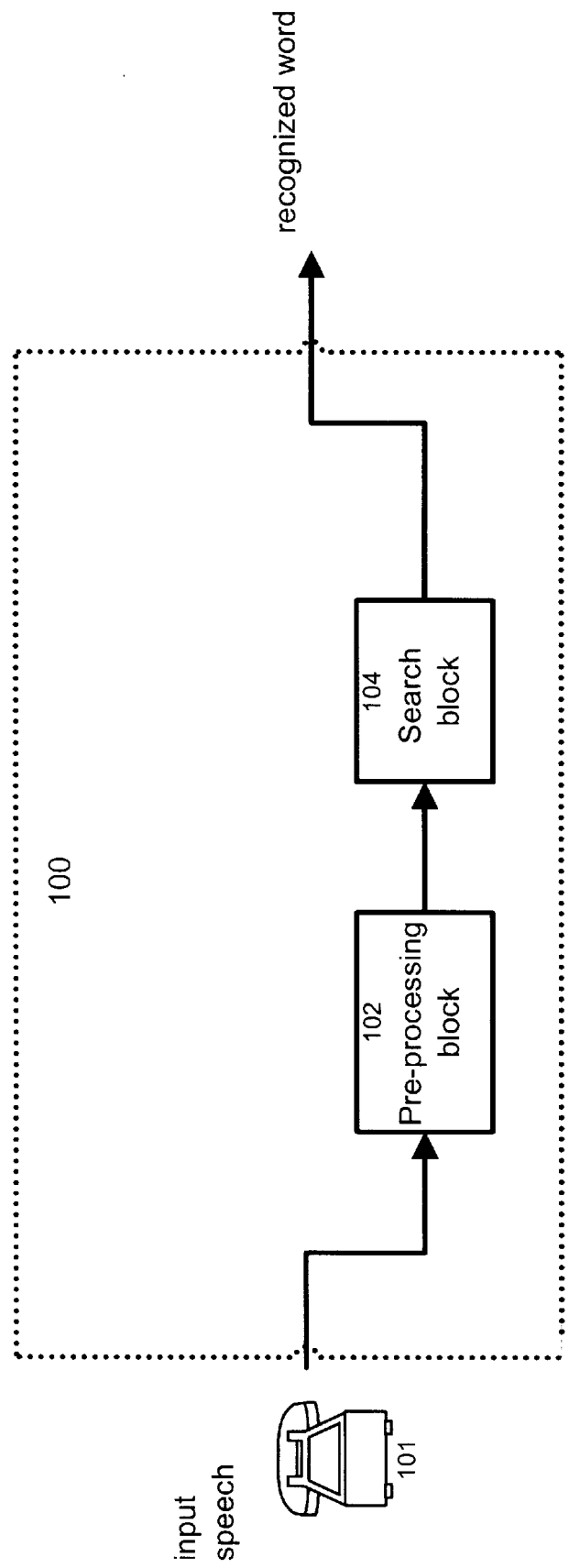
FIG. 1 shows a block diagram of a general speech recognition system.

Speech recognition systems have been developed in many parts of the world and, although it is difficult to describe a standard recognition system architecture, some characteristics are shared between many of them. A typical speech recognition system, of the type depicted in FIG. 1, generally comprises a device such as a microphone or telephone set 101 to convert the spoken utterance into an electric signal and transmit the signal to the speech recognition unit 100. The speech recognition unit 100 can be split into two functional blocks namely a pre-processing block 102 and a search unit 104. The pre-processing unit 102, also called the acoustic processor, performs the segmentation, the normalisation and the parameterisation of the input signal waveform. In some cases, especially for connected word speech, this stage may also include a feature extraction operation. The search block 104 includes a speech recognition dictionary that is scored in order to find possible matches to the spoken utterance. The search may be done in several steps in order to maximise the probability of obtaining the correct result in the shortest possible time and most preferably in real-time.

Figure 2:
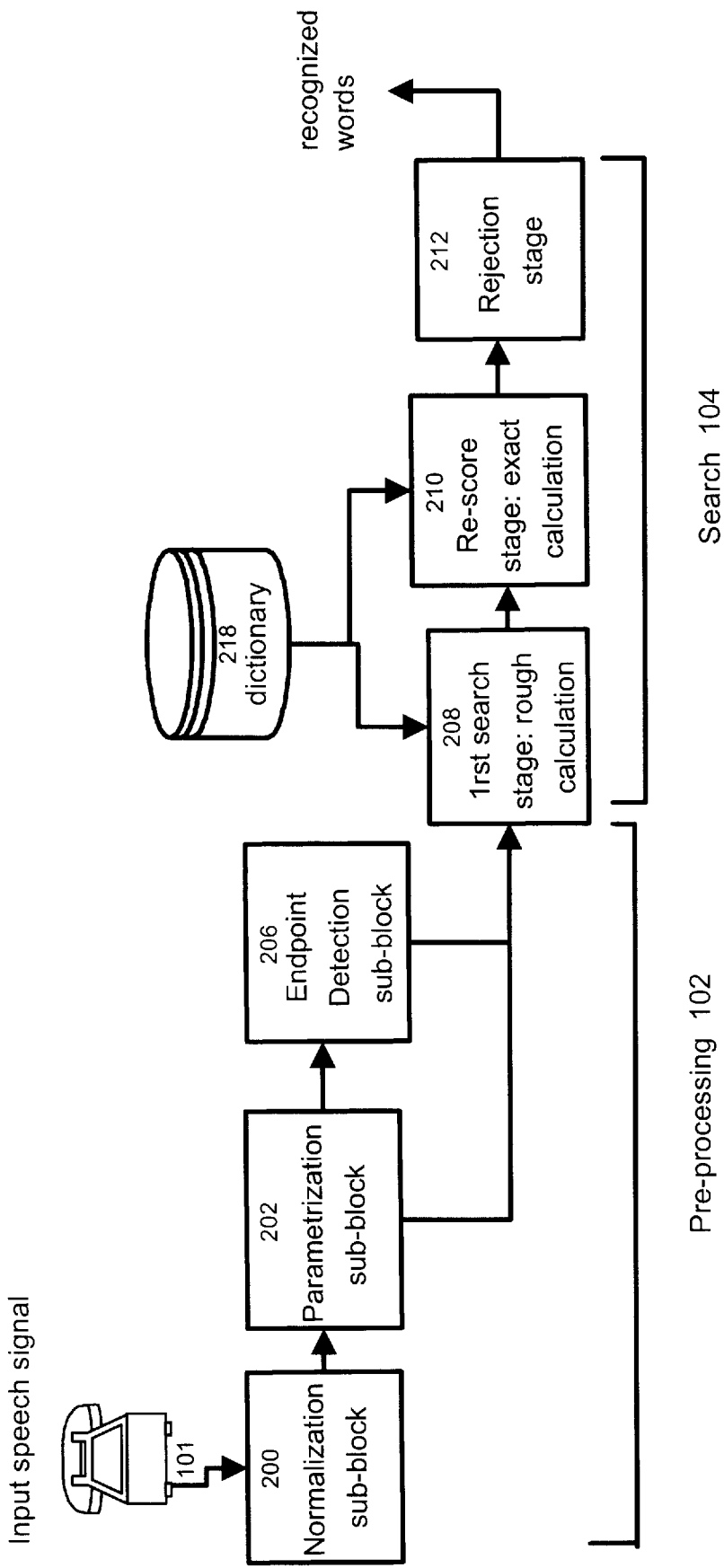
FIG. 2 shows a prior art speech recognition system.

More specifically, the purpose of the pre-processing block 102, illustrated in greater detail in FIG. 2, is first to translate the incoming analog speech waveform into digital format. This can be done with the use of a simple A/D converter, a spectrogram generator or any other suitable technique. The input signal is then split into short segments called analysis frames whose typical duration ranges from 5–20 ms. All further processing will be done relative to these frames. In general, the pre-processing block comprises a normalisation sub-block 200, a parameterisation sub-block 202 and an endpoint detection sub-block 206. The normalisation sub-block 200 adjusts the maximum signal amplitude of each analysis frame to a standard level in order to take into account variations in speech intensity, transmission losses and other physical effects such as distance from the microphone and recording level. The parameterisation sub-block 202 typically represents speech frames in terms of voicing decision, amplitude and fundamental frequency. A wide variety of parameters can be used in the parameterisation block the most common being LPC coefficients, Mel-based cepstral coefficients, energies in a channel vocoder and zero crossing rate in a band-pass channel. The final sub-block of the pre-processing modeule, the endpoint detection or segmentation sub-block 206 splits the input signal waveform into start and end of the speech utterance. This stage uses algorithms whose purpose is to locate the boundaries between silence and speech. In continuous and connected speech recognition, the endpoint detection stage is only used to provide a crude estimate of speech boundaries. In the 1980's, most systems used the short term energy and the zero crossing rate as indication of the beginning or end of a word. Currently, endpoint detection units use many parameters including frame energy, frame voice labels and other statistical variance parameters derived from speech.

The search functional block 104, shown in more detail in FIG. 2, ranks all the orthographies in a dictionary such as to be able to derive the orthography or orthographies which have the highest probability of matching the spoken utterance. This block comprises three functional layers of speech processing and a dictionary. The purpose of performing the search in three separate stages is to improve the performance in terms of computation and speed. The first rough calculation stage 208, also called first pass search stage, allows the system to eliminate those orthographies that are most unlikely to constitute a match to the spoken utterance. For these orthographies, the exact score assigned by a more precise calculation (e.g. Viterbi) would serve no useful purpose. However, the time saved by performing a simpler calculation improves the performance in speed of the system by several orders of magnitude.

More specifically, the first pass search stage 208, performs some rough probabilistic calculations and extracts from the speech recognition dictionary 218 a list of possible candidates for the spoken utterance. Typical algorithms that can be used at this stage include the fast score estimation and the graph search algorithms. As a reference, the reader is invited to consult Gupta V. N., Lennig M., Mermelstein P. "A fast search strategy in a large vocabulary word recogniser INRS-Telecommunications. J. Acoust. Soc. Am. 84 (6), December 1988, p. 2007 and U.S. Pat. No. 5,515,475 by inventors Gupta V. N. & Lennig M. The content of these documents is incorporated herein by reference.

The second layer, often called the re-score stage 210, performs more precise calculations but only on the top N candidates in the list supplied by the first pass search. At this stage, techniques such as the Viterbi algorithm with complete allophone models and model distances will be used. Although these require heavy complex computations, the number of candidates for which the computation must be performed has been greatly reduced. The result of the re-score stage is a short list of orthographies with their associated exact scores (probabilities of being a match to the spoken utterance). The two highest-ranking orthographies in the list are then typically transferred to the rejection stage 212.

The rejection stage 212, compares the two top orthographies obtained by the re-score stage 210 and, according to a chosen threshold, will determine if a possible correct mapping was found or if there is confusion between the two top orthographies. If the difference between the two top orthographies is such that it is less than the threshold, the system may abort the operation on the basis that a resolution between the two orthographies cannot be made. On the other hand if the difference between the orthographies is sufficient, the one having the highest score is output as the best choice. As a reference, the reader is invited to consult U.S. Pat. No. 5,097,509 by inventor Lennig M. entitled "A Rejection Method for speech recognition".

The speech recognition dictionary 218 used in the above described procedure can be organised in numerous ways. The dictionary may be stored in the form of a graph where the links between nodes are words with their associated probabilities. The organisation of the dictionary can have a significant impact on the performance of the speech recognition system.

A simple example of the operation of a prior art speech recognition system will make its functioning clearer. Let us assume that the speech recognition dictionary consists of the following list of orthographies where each entry is indicative of a locality potentially requested by the user:

| Dictionary |
| --- |
| Montreal |
| Laval |
| Lasalle |
| Quebec |
| ... |
| Ottawa |

Assume that the input speech was "Laval". The first stage of the search 208, after reordering the results, might yield the following candidate list:

| Locality | Probability of match to the spoken utterance (rough estimate) |
| --- | --- |
| Lasalle | 0.8 |
| Laval | 0.75 |
| Montreal | 0.6 |
| Quebec | 0.55 |
| ... | ... |

As shown in the above table, the first pass search stage scores all the orthographies in the dictionary then selects the top N scores in the graph. In this example consider only the top three scores.

This list is then passed to the re-score stage 210 that calculates more precise likelihoods for each candidate. Note that the re-scoring is performed only for the candidates in the list. In a real world situation the list is much longer, typically containing between 6 and 30 entries. The re-scoring will be effected only on the top N candidates, N ranging typically from 6 to 30. The results of the re-scoring stage could be the following:

| Locality | Probability of match with the spoken utterance (exact calculation) |
| --- | --- |
| Lasalle | 0.85 |
| Laval | 0.78 |
| Montreal | 0.6 |

The two top scores in the previous table are sent to the rejection layer 212 which computes the likelihood of the top choice being correct using the P3 rejection algorithm (for more details on this algorithm see U.S. Pat. No. 5,097,509). In simple terms, this algorithm computes the following:

IF (rejection value>Threshold Value)

Submit top score as answer

ELSE

Invoke default procedure, such as passing the matter to a human operator.

Speech recognition units of the type described earlier have been used in the past for locality recognition in automated directory assistance systems. Such systems are usually integrated into a telephone network allowing users to formulate requests from terminal subscriber equipment such as fixed or mobile telephone sets. In the normal course of providing the directory assistance function, those systems prompt the user to indicate in what locality resides the entity whose telephone number is being sought. Accurate locality recognition is a crucial step in the success of the operation since each locality is associated with an individual speech recognition dictionary that contains the names of the entities that can be recognized by the system. Thus, should the wrong locality be output as a top choice by the speech recognition layer, the remaining processing of the automated directory assistance function is most likely to fail since the wrong choice in the locality implies that the wrong speech recognition dictionary of entity names will be invoked during the post locality processing.

The present inventor has made be unexpected discovery that the accuracy of the speech recognition system as it relates to locality recognition can be significantly improved by utilizing in the process of recognition data indicative of the process of location of the user and on the called directory assistance number.

This enables to augment the recognition accuracy by taking into account statistical data derived from calling patterns. In a specific example the calling patterns may indicate that a user residing in a certain locality is more likely to request a telephone number of an entity residing in locality A, rather than in locality B. If localities A and B have a similar acoustical structure, the a priori advisor based on geographical location can be used to bias one locality more than the other and thus provide a resolution.

In a most preferred embodiment, the probability that a certain locality is the one matching the spoken utterance is conditioned on two separate elements namely the calling NPA-NXX and the called number. This a priori estimate is usually expressed as P (called locality| calling NPA-NXX, called number). In the province of Quebec, the called number can be either 411 or 555-1212 or NPA-555-1212. Therefore the a priori estimates are reduced to three possible elements:

A) P (called locality |calling NPA-NXX, 411 or 555-1212),

B) P (called locality | calling NPA-NXX, NPA-555-1212), and

C) P (called locality | called NPA).

To estimate the probabilities resulting from possibilities A, B and C above, the speech recognition dictionary has a number of histograms that establish a relationship between localities and probability data. Preferably, a histogram is estimated for each relevant NPA-NXX combination or called NPA. The following example will illustrate this.

The speech recognition system in this example comprises a set of histograms that can be addressed on the basis of a histogram identifier stored in a lookup table shown in table 1 below. These indices depend on both the called number and the calling NPA-NXX and NPAs. The left column corresponds to called number and the right column corresponds to the calling NPA-NXX or NPA followed by the histogram index. For example if the called number were 411 and the calling number 514-421-7563 then histogram 5 would be selected.

TABLE 1

Sample of a priori table with indices to the histograms

| Called Number | Calling NPA-NXX: histogram index |
|---|---|
| 411 or 555-1212 | 514-620:4; 514-421:5; 819-829:6; 418-621:7; 418:1; 514:2; 819:3; |
| 418-554-1212 | 418-621:7; 418:1; |
| 514-555-1212 | 514-620:4; 514-421:5; 514:2; |
| 819-555-1212 | 819-829:6; 819:3; |

In the preferred embodiment of this invention, two separate histogram sets can be referred to depending upon the particular case involved. The first histogram set includes a plurality of individual histograms, each histogram being associated with a given NPA. In a specific example that could apply to the province of Quebec, three histograms would be provided, for the respective NPAs 514, 418 and 819. The histograms are illustrated below and have N records each and are therefore associated with a speech recognition dictionary containing a orthographies:

| Locality index | Probability value |
|---|---|
| NPA = 514 | |
| Locality (0) | 0.055 |
| Locality (1) | 0.100 |
| Locality (2) | 0.050 |
| Locality (3) | 0.003 |
| ... | ... |
| Locality (N) | 0.040 |
| NPA = 418 | |
| Locality (0) | 0.040 |
| Locality (1) | 0.008 |
| Locality (2) | 0.200 |
| Locality (3) | 0.001 |
| ... | ... |
| Locality (N) | 0.034 |
| NPA = 819 | |
| Locality (0) | 0.045 |
| Locality (1) | 0.060 |
| Locality (2) | 0.005 |
| Locality (3) | 0.009 |
| ... | ... |
| Locality (N) | 0.013 |

The second histogram set includes an individual histogram for each NPA-NXX combination available. The following is an example of two histograms:

| Locality index | Probability value |
|---|---|
| NPA-NXX = 514–620 | |
| Locality (0) | 0.028 |
| Locality (1) | 0.067 |
| Locality (2) | 0.012 |
| Locality (3) | 0.102 |
| ... | ... |
| Locality (N) | 0.083 |
| NPA-NXX = 819–820 | |
| Locality (0) | 0.045 |
| Locality (1) | 0.003 |
| Locality (2) | 0.071 |
| Locality (3) | 0.001 |
| ... | ... |
| Locality (N) | 0.043 |

Figure 3:
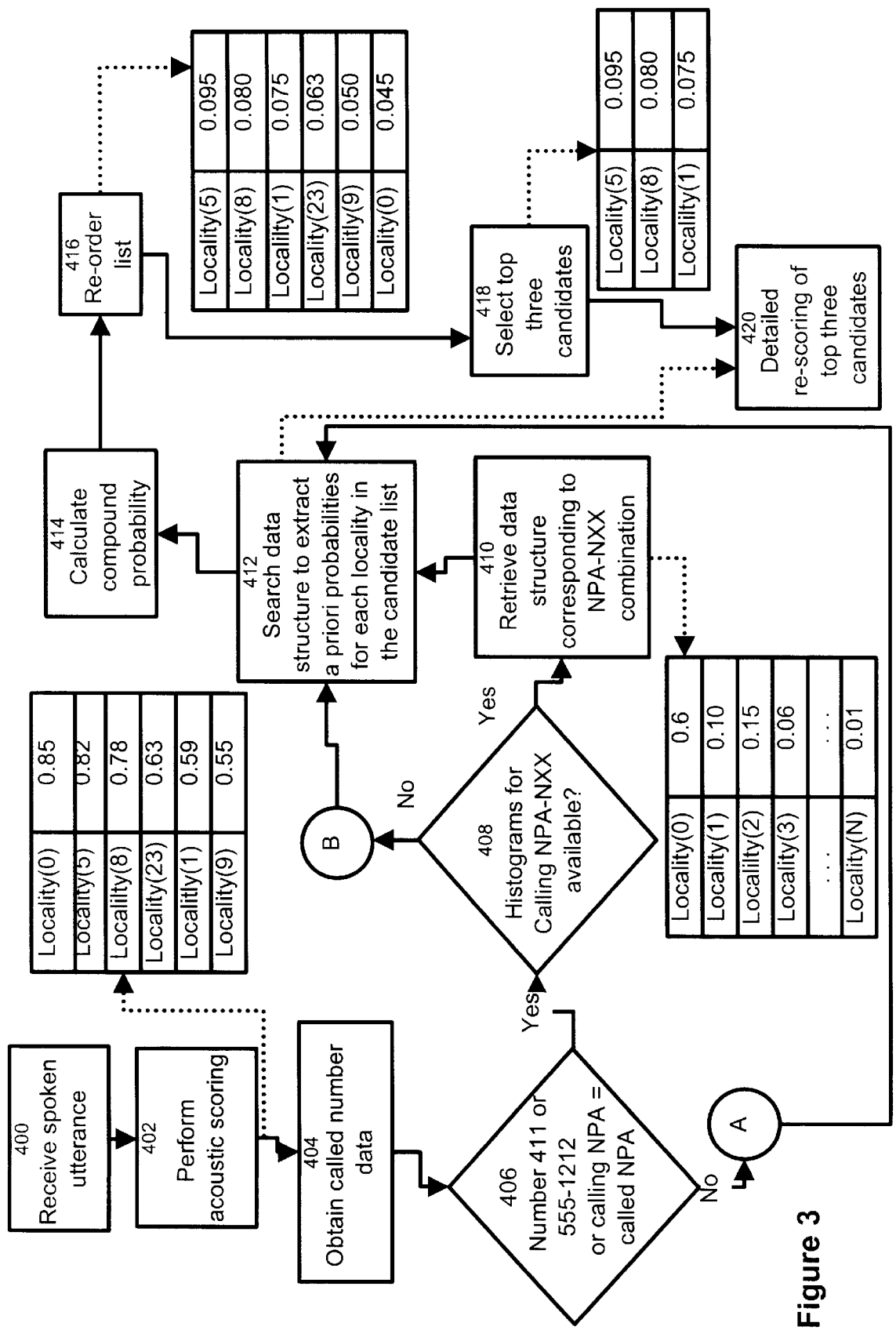
FIGS. 3, 4 & 5 are flowcharts illustrating the operation of a speech recognition apparatus utilizing the histograms generated with the method and apparatus in accordance with the invention.

During the operation of the speech recognition system the information contained in these histograms is consulted and contributes to determine the orthography that the system will output as top choice. The flowchart in FIG. 3 illustrates the orthography selection process in greater detail.

When the spoken utterance is received at step 400, the signal is scored based on acoustic criteria, as shown at step 402. Algorithms, such as the fast match algorithm may be used to perform this scoring. The fast match algorithm scores all the orthographies in the speech recognition dictionary. For the purpose of illustration, an ordered list of scored orthographies is shown in the table depicted at FIG. 3. At this stage it is not necessary to order the list. For more information on the fast match algorithm, the user may wish to consult Gupta V. N., Lennig M., Mermelstein P. "A fast seach strategy in a large vocabulary word recogniser" INRS-Telecommunications. J. Acoust. Soc. Am. 84 (6), December 1988, p. 2007 and U.S. Pat. No. 5,515,475 by inventors Gupta V. N. & Lennig M. The content of these documents is incorporated herein by reference. At step 404 of the process, the number that the user dialed to obtain directory assistance is analyzed. If this number is a local number (such as 411 or 555-1212 for the province of Quebec), in other words no NPA has been dialed or the NPA corresponds to the local region, the process at the conditional step 406 is answered in the affirmative. If any other number has been dialed, the conditional step branches to processing block A, that will be discussed later in greater detailed in connection with FIG. 4.

Conditional step 408 determines if the NPA-NXX for the telephone number of the user who has requested the directory assistance function is available and if an a priori histogram exists for that NPA-NXX combination. If the NPA-NXX combination is not available or has not been programmed into the system, in other words no histogram that provides probability values based on calling patterns for this NPA-NXX combination exists, the conditional step 408 is answered in the negative and processing continues at block B that will be described in greater detail later in connection with FIG. 5. However, if the NPA-NXX combination is available and a histogram exists for that combination in the system, the process continues at step 410 where the histogram is retrieved from memory and prepared for further processing. At step 412, the histogram is searched for each locality present in the dictionary. If the search is successful, the a priori probabilities associated with the locality name are obtained from the histogram and stored in memory. At step 414, the system computes a compound probability based on the probability value of acoustical match and the probability value extracted from the a priori advisor. In the present embodiment the following equation is used to compute the compound probabilities also referred to as log likelihoods in the literature:

Log (compound probability)=
log(acoustic probability)+0.007×
[number of speech frames * log(a priori probability)]

Once the compound probability value is obtained, the list of candidates is re-ordered 416. The ordered list is shown in FIG. 3. By comparison to the original list, a number of entries have changed position. Now, Locality(5), Locality(8) and Locality(1) occupy the first three slots, while previously those positions were taken by localities Locality(0), Locality (5) and Locality(8).

At step 418, the top three candidates in the re-ordered list are taken and passed to the re-scoring stage 420 where a full acoustic match analysis with the spoken utterance is performed so an orthography can be chosen as the best possible match with the spoken utterance. As a variant, the re-score stage may also use the a priori probabilities stored in the histograms as shown by the dotted line between step 412 and 420 in FIG. 3.

Figure 4:
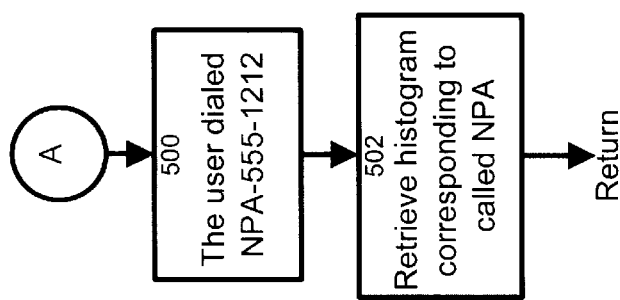

Returning back to conditional step 406, should this step be answered in the negative, which indicates that a determination was made that the user has dialed the telephone number of the automated directory assistance system preceded by an NPA (area code) combination 500, the process branches to flow chart block A illustrated at FIG. 4. At step 502, the system uses the default histogram corresponding to that NPA, the NPA being the one of the called number, not the one of the user's telephone number.

Conditional step 408 is answered in the negative when the calling NPA-NXX combination is not available or not programmed in the system. In this case, the system defaults to a procedure that establishes the compound probability value based on histograms associated with the called NPA rather than the calling NPA-NXX combination. The flow chart block B illustrated in FIG. 5 describes the procedures in detail. More specifically, at functional block 600 the NPA of the called number is obtained. The histogram corresponding to this NPA is obtained as shown in block 602. The processing is then resumed at step 412 in FIG. 3 where the compound probability values are computed on the basis of the probability value extracted from the histogram and the probability value corresponding to the acoustical match is used to re-order the candidate list.

Figure 5:
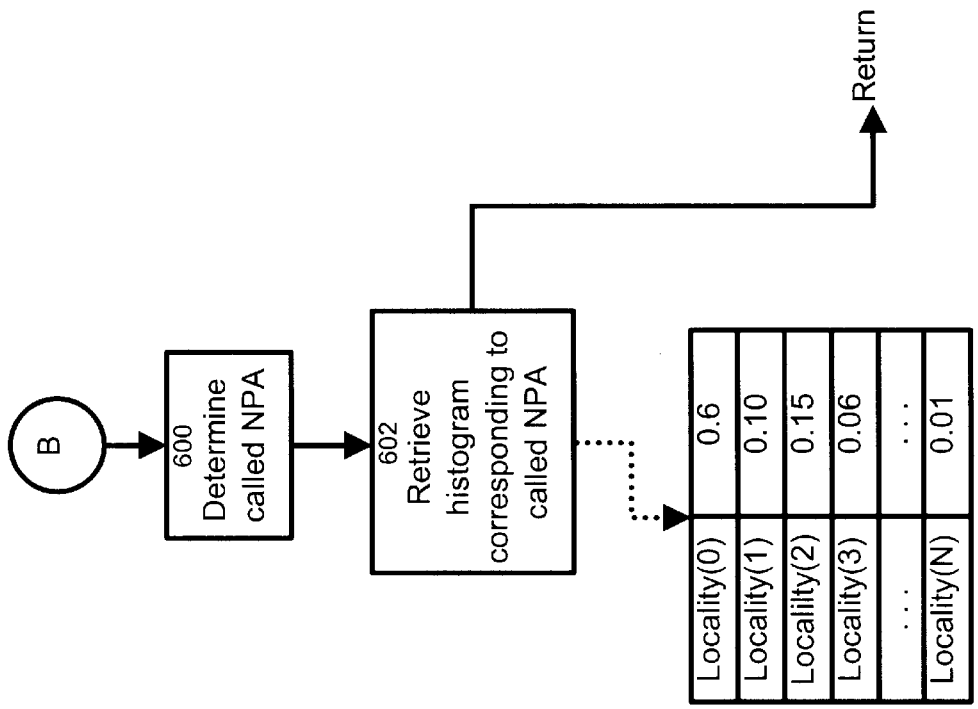

In the example of the operation of the speech recognition system depicted at FIGS. 3, 4 and 5, the probability derived from the histograms is applied to all the orthographies in the speech recognition dictionary before selecting a set of candidates. The operation of the system can be simplified by performing these computations separately. For example, the a priori probabilities are extracted exclusively from the top N orthographies. This can be effected by identifying the applicable histogram and searching for the relevant localities in the histogram computing the log likelihoods only for the candidates in the list.

The above description of a preferred embodiment should not be interpreted in any limiting manner since variations and refinements can be made without departing from the spirit of the invention. For instance, although an example of the invention has been provided above with strong emphasis on an automated directory assistance system, the apparatus using an a priori advisor for the speech recognition dictionary could also be used in other types of speech recognition systems. The scope of the invention is defined in the appended claims and their equivalents.

I claim:

1. An automated directory assistance system comprising:
   a) a speech recognition dictionary including a plurality of vocabulary items potentially recognizable on a basis of a spoken utterance by a user of said automated directory assistance system, each vocabulary item being indicative of a locality in which an entity whose telephone number potentially sought by the user may reside;
   b) extraction unit for extracting from said speech recognition dictionary on the basis of the spoken utterance by the user a plurality of vocabulary items, each of said plurality of vocabulary items being a candidate having a certain probability to correspond to the spoken utterance, said plurality of vocabulary items forming a list of candidates;
   c) a plurality of a priori data structures, each a priori data structure containing a plurality of probability data elements, the probability data elements being derived at least in part on a basis of call records indicative of prior automated directory assistance transactions;
   d) a selecting unit for selecting one of said a priori data structures; and e) a weighing unit for weighing candidates in said list on a basis of probability data elements in said one of said a priori data structures.

2. An automated directory assistance system as defined in claim 1, wherein said weighing unit for weighing the candidates establishes for each candidate a compound probability value that is indicative of a likelihood of match of the candidate with the spoken utterance, the compound probability depending in part on a degree of acoustic match between the candidate and the spoken utterance and depending in part on a probability data elements in said one of said a priori data structures.

3. An automated directory assistance system as defined in claim 2, wherein said selecting unit is operative for processing data indicative of at least a portion of a telephone number of a terminal from which the user is inputting the spoken utterance to select one of said a priori data structures.

4. An automated directory assistance system as defined in claim 3, wherein said selecting unit is operative for processing an NPA-NXX of a telephone number of a terminal from which the user is inputting the spoken utterance to select one of said a priori data structures.

5. An automated directory assistance system as defined in claim 4, wherein said selecting unit comprises:
   a) an input for receiving an NPA-NXX combination of a telephone number of a terminal from which the user is inputting the spoken utterance,
   b) an identification unit for identifying an a priori data structure associated with said NPA-NXX combination in said plurality of a priori data structures, said weighing unit including:
      a searching unit for searching the a priori data structure identified at paragraph b to extract therefrom a probability data element corresponding to at least one candidate in said list.

6. An automated directory assistance system as defined in claim 4, wherein each a priori data structure includes a plurality of indices, each index being associated with a corresponding probability data element.

7. An automated directory assistance system as defined in claim 3, wherein said weighing unit is operative for retrieving a probability data element from said one of said a priori data structures for each candidate in said list.

8. An automated directory assistance system as defined in claim 7, wherein said directory assistance system includes a plurality of data structures, each data structure being associated with an identifier of geographical location from which a user may input the spoken utterance.

9. An automated directory assistance system as defined in claim 8, wherein said identifier is at least a portion of a telephone number.

10. An automated directory assistance system as defined in claim 8, comprising:
    a) an input for receiving data indicative of at least a portion of a telephone number of a terminal at which the user is inputting the spoken utterance,
    b) an identification unit for identifying a data structure associated with the data indicative of at least a portion of a telephone number of a terminal at which the user is inputting the spoken utterance,
    c) a search unit for searching the data structure identified at paragraph b to extract therefrom probability data corresponding to at least one candidate.

11. An automated directory assistance system as defined in claim 10, wherein said search unit for searching the data structure has the ability to search the data structure for each of said plurality of vocabulary items and output probability data associated with each candidate.

12. An automated directory assistance system as defined in claim 10, comprising a selecting unit for selecting N candidates from the list, where N is less than the total number of candidates in the list.

13. An automated directory assistance system as defined in claim 12, comprising a re-scoring unit for re-scoring the N candidates selected in the list to determine for each of the N candidates a likelihood of match with the utterance on a basis of the degree of acoustic match between the utterance and the candidate.

14. An automated directory assistance system as defined in claim 12, wherein N is in the range of 6 to 24.

15. An automated directory assistance system as defined in claim 2, comprising a ranking unit for ranking the candidates in accordance with said command probability value.

16. A method for performing speech recognition in an automated directory assistance system, said method comprising the steps of:
    a) providing a speech recognition dictionary including a plurality of vocabulary items potentially recognizable on a basis of a spoken utterance by a user of said automated directory assistance system, each vocabulary item being indicative of a locality in which an entity whose telephone number potentially sought by the user may reside;
    b) receiving a spoken utterance by the user of the automated directory assistance system;
    c) searching said dictionary to derive a list of vocabulary items, each vocabulary item in said dictionary being a candidate having a certain probability to be a match to the spoken utterance;
    d) selecting a certain a priori data structure from a plurality of a priori data structures on a basis of a geographical location associated with the user, the certain a priori data structure containing a plurality of a priori probability values, the plurality of probability values being derived at least in part on a basis of call records indicative of prior automated directory assistance transactions; and
    e) assigning to at least one vocabulary item in said list of vocabulary items an a priori probability value selected from said certain a priori data structure.

17. A method for performing speech recognition in an automated directory assistance system, said method comprising the steps of:
    a) providing a speech recognition dictionary including a plurality of vocabulary items potentially recognizable on a basis of a spoken utterance by a user of said automated directory assistance system, each vocabulary item being indicative of a locality in which an entity whose telephone number potentially sought by the user may reside;
    b) receiving an utterance spoken by the user of the automated directory assistance system;
    c) searching said dictionary to derive a list of vocabulary items, each vocabulary item in said list being a candidate having a certain probability to be a match to the spoken utterance;
    d) obtaining a certain identifier indicative of a geographical location of a terminal at which the user has input the spoken utterance;
    e) selecting a certain a priori data structure from a plurality of a priori data structures on a basis of the certain identifier, the certain a priori data structure containing a plurality of a priori probability values, the plurality of probability values being derived at least in part on a basis of call records indicative of prior automated directory assistance transactions; and f) utilizing a priori probability values in the certain a priori data structure to rank the candidates derived at step c in terms of likelihood of potential match with the spoken utterance.

18. A method for performing speech recognition as defined in claim 17, comprising the steps of:

a) for each candidate in the list searching the certain a priori data structure to extract a corresponding probability data element; and b) utilizing the probability data elements obtained at step a) to rank the candidates in said list in terms of likelihood of potential match with the spoken utterance.

19. A method for performing speech recognition as defined in claim 18, comprising the steps of:

a) providing a plurality of a priori data structures, each data structure establishing a correspondence between a plurality of vocabulary items in said speech recognition dictionary and corresponding probability data elements, each a priori data structure being assigned an identifier representative of a geographical location at which is located a terminal at which the user inputs the utterance, b) determining a value of said certain identifier; and c) searching the data structure corresponding to said certain identifier to extract probability data associated to several ones of the candidates.

20. A method for performing speech recognition as defined in claim 19, comprising the step of determining at least a portion of a telephone number of the terminal at which the user inputs the utterance to determine the value of the certain identifier.

21. An automated directory assistance system comprising:

a) a speech recognition dictionary including a plurality of vocabulary items potentially recognizable on a basis of a spoken utterance by a user of said automated directory assistance system, each vocabulary item being indicative of a geographical area, b) a first search unit for extracting from said speech recognition dictionary on the basis of the spoken utterance by the user a list of vocabulary items, each vocabulary item in said list being a candidate having a certain probability to constitute a match to the spoken utterance, c) a processing unit for deriving data indicative of a geographical location at which the user has formulated the utterance, d) a selecting unit for selecting from a plurality of a priori data structures a priori probability data elements on a basis of said geographical location at which the user has formulated the utterance, the probability data elements being derived at least in part on a basis of call records indicative of prior automated directory assistance transactions;

e) weighing unit for weighing candidates in said list of vocabulary items on a basis of said a priori data elements.

22. A machine readable storage medium containing a speech recognition dictionary for use in an automated directory assistance system, said speech recognition dictionary including:

a) a plurality of vocabulary items potentially recognizable on a basis of a spoken utterance by a user of the automated directory assistance system, each vocabulary item being indicative of a locality in which an entity whose telephone number potentially sought by the user may reside;

b) a plurality of identifier elements, each identifier element being indicative of a geographical area at which a user of the automated directory assistance system may formulate the spoken utterance;

c) a plurality of data structures associated with respective identifier elements, each data structure establishing a correspondence between several ones of said vocabulary items and probability data, said probability data allowing the automated directory assistance system to determine if a vocabulary item is a likely match to the spoken utterance.

23. A machine readable medium containing a program element for instructing a computer for selecting at least one vocabulary item from a speech recognition dictionary as being a likely match to a given spoken utterance, said computer including:

a) first memory unit containing the speech recognition dictionary;

b) a processor in operative relationship with the first memory unit;

c) said program element being operative for:
   i) directing the processor to select from the speech recognition dictionary a plurality of vocabulary items, the plurality of vocabulary items forming a list of candidates, each candidate having a certain probability to correspond to the spoken utterance;
   ii) directing the processor to select from a plurality of a priori data structures a priori probability data elements related to an identifier indicative of a geographical location associated to the terminal at which the user has formulated the utterance, the probability data elements being derived at least in part on a basis of call records indiative of prior automated directory assistance transactions,
   iii) directing the processor to weigh candidates in the list of candidates on a basis of the a priori data elements.

24. An automated directory assistance system comprising:

a) a speech recognition dictionary including a plurality of vocabulary items potentially recognizable on a basis of a spoken utterance by a user of said automated directory assistance system, each vocabulary item being indicative of a locality in which an entity whose telephone number potentially sought by the user may reside;

b) first processing unit for detecting at least a portion of a telephone number dialed by the user to access a directory assistance call function;

c) second processing unit responsive to said at least a portion of said telephone number dialed by the user and to the spoken utterance for determining a probability value for at least one of said vocabulary items, the probability value being indicative of a likelihood of match between said at least one of said vocabulary items and the spoken utterance.

25. An automated directory assistance system as defined in claim 24, wherein said at least a portion of a telephone number dialed by the user is an NPA portion of a telephone number permitting access to the directory assistance function.

26. An automated directory assistance system as defined in claim 25, comprising a computing unit for computing said probability value for a plurality of vocabulary items.

27. An automated directory assistance system as defined in claim 26, comprising a ranking unit for ranking vocabulary items on a basis of the computed probability values.

28. A method for at least partially automating directory assistance in a telephone system, said method comprising the steps of:

providing a plurality of vocabulary items potentially recognizable on a basis of a spoken utterance by a user of said automated directory assistance system, each vocabulary item being indicative of a locality in which an entity whose telephone number potentially sought by the user may reside;

detecting a spoken utterance by a user;

detecting at least a portion of a telephone number dialed by the user to access a directory assistance call function;

selecting at least in part on the basis of the spoken utterance and at least in part on a basis of said at least a portion of a telephone number dialed by the user at least one of said vocabulary items as being a probable match to the spoken utterance.

29. A method as defined in claim 28, wherein said at least a portion of a telephone number dialed by the user is an NPA portion of a telephone number permitting access to the directory assistance function.

30. A method as defined in claim 29, comprising the step of determining a probability value for a plurality of vocabulary items.

31. A method as defined in claim 30, comprising the step of ranking vocabulary items on a basis of the computed probability values.

* * * * *

UNITED STATES PATENT AND TRADEMARK OFFICE
CERTIFICATE OF CORRECTION

PATENT NO. : 6,122,361
DATED : September 19, 2000
INVENTOR(S) : GUPTA

It is certified that error appears in the above-identified patent and that said Letters Patent are hereby corrected as shown below:

In the title, change "PRIORI ADVISOR" to --A PRIORI ADVISOR--
Column 14, line 17, change "command" to --compound--

Signed and Sealed this

Twenty-second Day of May, 2001

*Attest:*

NICHOLAS P. GODICI

*Attesting Officer*     Acting Director of the United States Patent and Trademark Office